(12) United States Patent
Sheriff et al.

(10) Patent No.: US 10,897,515 B2
(45) Date of Patent: Jan. 19, 2021

(54) EFFICIENT STARTUP OF SERVICES FOR IN-FLIGHT ENTERTAINMENT DISPLAY TERMINALS

(71) Applicant: Panasonic Avionics Corporation, Lake Forest, CA (US)

(72) Inventors: Faizal Sheriff, Irvine, CA (US); Philip Watson, Lake Forest, CA (US)

(73) Assignee: PANASONIC AVIONICS CORPORATION, Lake Forest, CA (US)

( * ) Notice: Subject to any disclaimer, the term of this patent is extended or adjusted under 35 U.S.C. 154(b) by 0 days.

(21) Appl. No.: 16/297,088

(22) Filed: Mar. 8, 2019

(65) Prior Publication Data

US 2020/0287983 A1 Sep. 10, 2020

(51) Int. Cl.
*H04L 29/08* (2006.01)
*H04L 29/06* (2006.01)

(52) U.S. Cl.
CPC ........ *H04L 67/2809* (2013.01); *H04L 67/141* (2013.01); *H04L 67/42* (2013.01)

(58) Field of Classification Search
CPC ....... H04L 67/12; H04L 61/609; H04L 67/18; G06F 16/245; G06F 16/24578; G06F 16/29; G06F 16/387; G06F 16/437; G06F 16/4387; G06F 16/444; G06F 16/487; G06F 16/732; G06F 16/738; G06F 16/78; G06F 16/787; G06F 16/9537; G06F 8/61; G06F 8/65; G06F 8/658; G06F 9/4451; G06F 13/10; G06F 13/4282; G06F 17/30035; G06F 17/30041; G06F 17/30053; G06F 17/30241; G06F 17/30424; G06F 17/3053; G06F 17/3087; G06F 1/1698; G06F 1/266; G06F 1/3225; G06F 2203/04803; G06F 3/04886; G06F 3/0604; G06F 3/0659; G06F 3/0679
See application file for complete search history.

(56) References Cited

U.S. PATENT DOCUMENTS

| | | | |
|---|---|---|---|
| 6,757,712 B1 * | 6/2004 | Bastian | B64D 11/0015 709/203 |
| 7,319,854 B2 | 1/2008 | vonDoenhoff et al. | |
| 7,921,192 B2 | 4/2011 | Durrey et al. | |
| 7,931,192 B1 | 4/2011 | Pouncey | |
| 10,097,950 B2 | 10/2018 | Moyer et al. | |

(Continued)

*Primary Examiner* — Djenane M Bayard
(74) *Attorney, Agent, or Firm* — Perkins Coie LLP (57) ABSTRACT

A system for establishing persistent communications links between a plurality of terminals and a primary server includes one or more message brokers each publishing messages to one or more topics. A plurality of message clients each on a corresponding one of the plurality of terminals are subscribed to selected topics. The message clients are receptive to those messages published by the message brokers to the topics to which the respective one of the message clients is subscribed. A plurality of application clients, each of which are on a corresponding one of the plurality of terminals and linked with the respective one of the message clients thereon, initiate a request to the primary server in response to a published message to at least one of the topics to which the linked message client is subscribed.

17 Claims, 7 Drawing Sheets

(56) References Cited

U.S. PATENT DOCUMENTS

| | | | |
|---|---|---|---|
| 2002/0160773 A1* | 10/2002 | Gresham | B64D 11/0015 455/431 |
| 2008/0133705 A1* | 6/2008 | Lemond | G06Q 30/04 709/217 |
| 2012/0303826 A1* | 11/2012 | Nelson | H04B 7/18506 709/228 |

* cited by examiner

EFFICIENT STARTUP OF SERVICES FOR IN-FLIGHT ENTERTAINMENT DISPLAY TERMINALS

CROSS-REFERENCE TO RELATED APPLICATIONS

Not Applicable

STATEMENT RE: FEDERALLY SPONSORED RESEARCH/DEVELOPMENT

Not Applicable

BACKGROUND

1. Technical Field

The present disclosure relates generally to entertainment systems for transportation vehicles and data networking thereof, and more particularly, to the efficient startup of connectivity services for in-flight entertainment and communications (IFEC) system passenger display terminals.

2. Related Art

Air travel typically involves journeys over extended distances that at the very least take several hours to complete. Some of the longer non-stop international flights have scheduled durations of over sixteen hours with travel distances extending beyond ten thousand miles. Passengers on board the aircraft are confined within an enclosed space of a designated seat for the entire duration of the flight, with only a few limited opportunities to leave the seat for use of the lavatory and so forth. Thus, even on the shortest trips an airline passenger has some idle time, which the passenger may occupy with work, leisure, and/or rest.

Airlines thus provide onboard in-flight entertainment and communications (IFEC) systems that offer a wide variety of multimedia content for passenger enjoyment. Recently released movies are a popular viewing choice, as are television shows such as news programs, situation and stand-up comedies, documentaries, and so on. Useful information about the destination such as airport disembarking procedures, immigration and custom procedures and the like are also frequently presented. Audio-only programming is also available, typically comprised of playlists of songs fitting into a common theme or genre. Likewise, video-only content such as flight progress mapping, flight status displays, and so forth are available. Many in-flight entertainment systems also include video games that may be played by the passenger.

The specific installation may vary depending on service class, though in general, each passenger seat is equipped with a display device, an audio output modality, an input modality, and a terminal unit. The terminal unit may generate video and audio signals, receive inputs from the input modality, and execute pre-programmed instructions in response thereto. The display device is typically an LCD screen that is installed on the seatback of the row in front of the passenger, though in some cases it may be mounted to a bulkhead or retractable arm, or the like, that is in turn mounted to the passenger's seat. Furthermore, the audio output modality is a headphone jack, to which a headphone, either supplied by the airline or by the passenger, may be connected. Inputs to the terminal unit may be provided via a separate multi-function remote controller or by via a combination touch display. Although the terminal unit and display device were separate components in earlier IFEC implementations, more recently, these components and more may be integrated into a single smart monitor.

The multimedia content is encoded and stored as digital data, with a video decoder and audio decoder of the terminal unit functioning to generate the aforementioned video and audio signals therefrom. It is desirable to have a wide range of different multimedia content to satisfy the varying tastes of passengers. It is also desirable to have a sufficient volume of multimedia content so that passengers can remain occupied with entertainment for the entire duration of the flight. This data may be stored on a central content server, with each terminal unit including networking modalities such as Ethernet to establish a data communications link to the central content server. Following retrieval, the multimedia content data is decoded and presented on the display device.

Starting with the smart monitor being powered up, typically in conjunction with powering on the other electrical systems in the aircraft cabin, a boot-up procedure is initiated, including loading the operating system into memory and initiating the various system services and client applications. Additionally, a persistent communications link is established with the IFEC server so that content and other data may be responsively retrieved, with the typical procedure involving the transmission of a request from the smart monitor to the IFEC server, and the IFEC server then transmitting a response back to the smart monitor.

The startup procedure of the smart monitor may be faster than that of the IFEC server, and so it may be completed earlier if the IFEC server and the smart monitor are powered on together. Until and unless a connection to the IFEC server can be established, there may be little, if any functionality or content that is available on the smart monitor. While the smart monitor may begin to attempt establishing the communications link with the IFEC server immediately after boot up, a sustained lack of a connection may introduce delays with respect to the smart monitor becoming functional.

On an individual basis, the available network bandwidth and the processing capacity of the IFEC server is usually more than adequate to perform this handshaking procedure. However, with hundreds of smart monitors attempting to establish a connection with the IFEC server more or less simultaneously, there may be substantial delays resulting from these connection requests overwhelming the IFEC server.

To some extent, these delay problems can be mitigated by sequencing the connection requests from the smart monitors to the server based on seat identifiers and other parameters to avoid server overload. However, a delay in establishing the communications link between the smart monitor and the IFEC server still remains. Accordingly, there is a need in the art for an improved smart monitor and IFEC system connection procedure that minimizes startup delay. There is also a need for a more efficient startup of connectivity services for IFEC passenger display terminals.

BRIEF SUMMARY

The present disclosure is directed to an in-flight entertainment and communications system with more efficient startup procedures in which a server publishes an availability to accept communications requests to one or more topics. The terminals are subscribed to these topics, and upon a message being published to those subscribed topics, may responsively initiate requests to the server.

According to one embodiment, there is a system for establishing persistent communications links between a plurality of terminals and a primary server. The system may include one or more message brokers each publishing messages to one or more topics. A first one of the one or more message brokers may be executed on the primary server. Additionally, the system may include a plurality of message clients each on a corresponding one of the plurality of terminals. Each of the terminals may be connected to the primary server over a data transfer link. Additionally, each of the message clients may be subscribed to selected topics. The message clients may be receptive to those messages published by the one or more message brokers to the topics to which the respective one of the message clients is subscribed. The system may further include a plurality of application clients, each of which are on a corresponding one of the plurality of terminals and linked with the respective one of the message clients thereon. At least one of the plurality of application clients may initiate a request to the primary server in response to a published message to at least one of the topics to which the linked message client is subscribed.

Another embodiment of the present disclosure may be an in-flight entertainment and communication head-end server connectible to a plurality of passenger display terminals. The server may include a data network interface that connects to each of the plurality of passenger display terminals over data transfer links. Furthermore, there may be an application server with which each of the plurality of passenger display terminals selectively establishes a persistent communications link over the respective data transfer links. There may be a message broker that publishes messages to one or more selected topics. A first selected subset of the passenger display terminals may be directed to initiate the respective one of the persistent communications links to the application server based upon a message published to a first topic to which message clients being executed on corresponding ones of the first selected subset of the passenger display terminals is subscribed.

According to still another embodiment of the disclosure, there may be an in-flight entertainment and communications passenger display terminal. The display terminal may include a processor, as well as a data network interface connectible to a head-end server computer system and other passenger display terminals over one or more data transfer links. There may also be a message client executed by the processor. The message client may be subscribed to one or more topics to which a remote message broker service publishes messages. The display terminal may also include an application client executed by the processor. The application client may initiate a persistent communications link to an application service being executed on the head-end server computer system. This may be in response to a first message published by the remote message broker service to a first one of the one or more topics to which the message client is subscribed. The display terminal may also include a local message broker service with a deactivated state and an activated state. The local message broker service may be in communication with the other passenger display terminals. In the activated state, the local message broker service may publish messages to the one or more topics to which message clients being executed on the other passenger display terminals are subscribed.

The present disclosure also contemplates a method for initiating connectivity services between a plurality of passenger display terminals and an in-flight entertainment and communications system. The method may include initiating a terminal-side startup procedure on the plurality of passenger display terminals. A first set of the plurality of passenger display terminals each with message clients may be subscribed to a first topic. A second set of the plurality of passenger display terminals each with message clients may be subscribed to a second topic. The method may further include independently initiating a server-side startup procedure on the in-flight entertainment and communications system. The in-flight entertainment and communications system may include a first message broker and an application server. The method may continue with publishing, by the first message broker, a first message to the first topic in response to a completion of the server-side startup procedure. This may be followed by initiating persistent communications links from application clients on the first set of the plurality of passenger display terminals. Such initiating of the persistent communications links may be in response to the first message to the first topic to which the corresponding message clients are subscribed.

The present disclosure will be best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

The detailed description set forth below in connection with the appended drawings is intended as a description of the several presently contemplated embodiments of in-flight entertainment and communications systems with improved efficiency in the startup of connectivity services utilized by passenger display terminals and head-end servers. This description is not intended to represent the only form in which the embodiments of the disclosed invention may be developed or utilized. The description sets forth the functions and features in connection with the illustrated embodiments. It is to be understood, however, that the same or equivalent functions may be accomplished by different embodiments that are also intended to be encompassed within the scope of the present disclosure. It is further understood that the use of relational terms such as first and second and the like are used solely to distinguish one from another entity without necessarily requiring or implying any actual such relationship or order between such entities.

Figure 1:
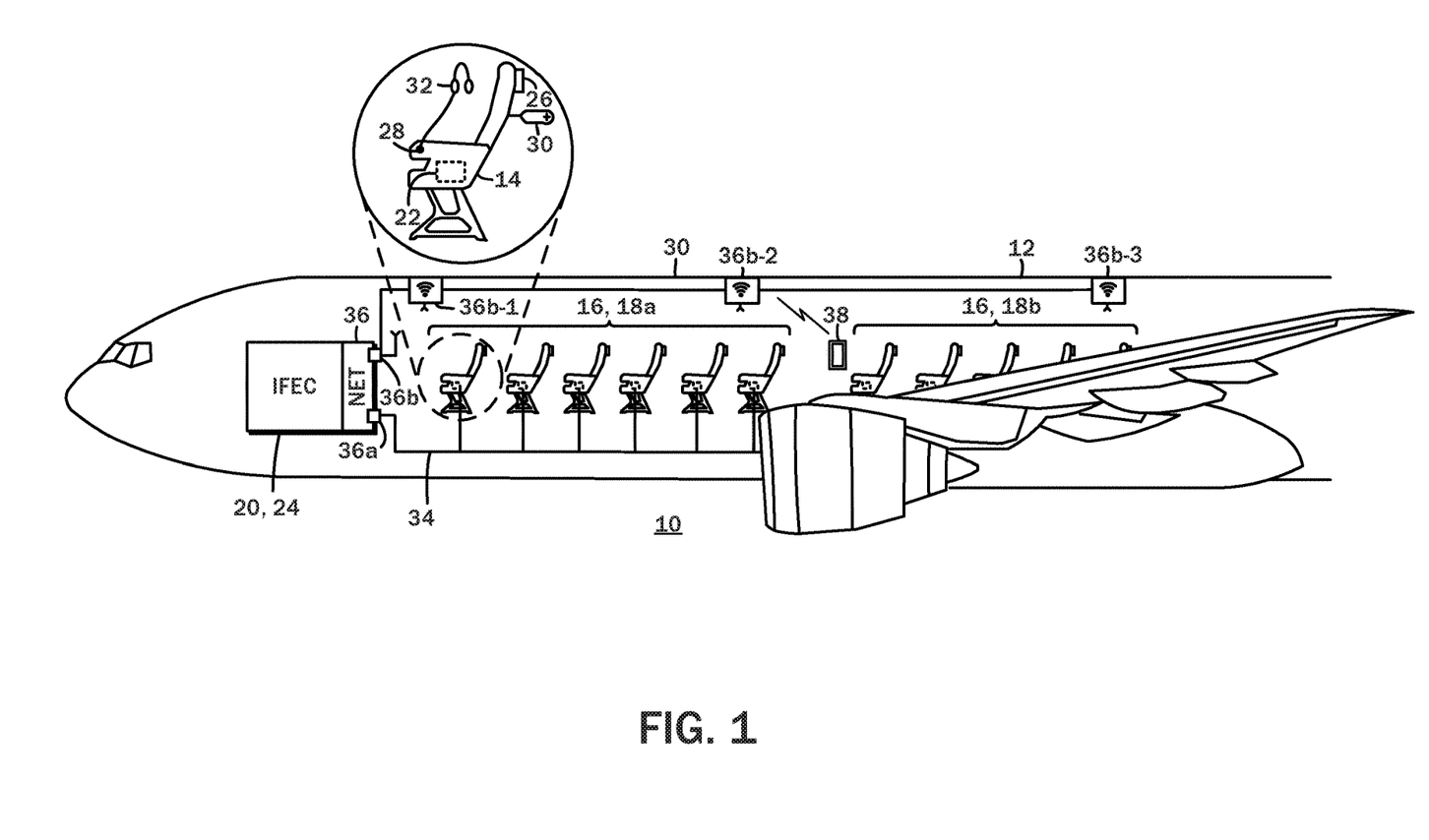
FIG. 1 is a diagram illustrating an environment in which the presently disclosed in-flight entertainment and communications (IFEC) system may be implemented.

FIG. 1 is a simplified diagram of an aircraft 10, generally referred to herein as a vehicle, along with select subsystems and components thereof that are utilized in connection with the embodiments of the present disclosure. Within a fuselage 12 of the aircraft 10, there may be seats 14 arranged over multiple rows 16, with each seat 14 accommodating a single passenger. The cabin may be separated into multiple segments, such as, for example, a first section 18*a* and a second section 18*b*. Although the features of the present disclosure will be described in the context of the aircraft 10, this is by way of example only and not of limitation. The presently disclosed system for conversion of data over wireless networks may be utilized in any other context as appropriate, such as, by way of non-limiting illustrative example, the disclosed system may be used on busses, trains, ships, and other types of vehicles.

Installed in the aircraft 10 is an in-flight entertainment and communications (IFEC) system 20, through which various entertainment and connectivity services may be provided to passengers while onboard. When referenced generally, the IFEC system 20 is understood to encompass the terminal devices 22 installed for each seat 14, as well as the server 24 and the other components involved in the delivery of the entertainment and communications functionality. In the illustrated embodiment, this includes a display 26, and audio output 28, and a remote controller or handset 30. For a given row 16 of seats 14, the terminal device 22 and the audio output 28 are disposed on the seat 14 for which it is provided, but the display 26 and the handset 30 may be located on the row 16 in front of the seat 14 to which it is provided. That is, the display 26 and the handset 30 are installed on the seatback of the row in front of the seat. This is by way of example only, and other display 26 and handset 30 mounting and access configurations such as a retractable arm or the like mounted to an armrest of the seat 14 or by mounting on a bulkhead are possible.

The display 26 is understood to be a conventional liquid crystal display (LCD) screen or other type with a low profile that is suitable for installation on the seatback. Each passenger can utilize an individual headset 32, supplied by either the airline or by the passenger, which provides a more private listening experience. In the illustrated embodiment, the audio output 28 is a headphone jack that is a standard ring/tip/sleeve socket. The headphone jack may be disposed in proximity to the display 26 or on the armrest of the seat 14 as shown. The headphone jack may be an active type with noise canceling and including two or three sockets or a standard audio output without noise canceling. In alternate embodiments, each display 26 may incorporate the aforementioned terminal device 22 to form a unit referred to in the art as a smart monitor.

A common use for the terminal device 22 installed on the aircraft 10 is the playback of various multimedia content. The terminal device 22 may be implemented with a general-purpose data processor that decodes the data files corresponding to the multimedia content and generates video and audio signals for the display 26 and the audio output 28, respectively. The multimedia content data files may be stored in one or more repositories associated with the IFEC system 20, and specifically the server 24 thereof. Each of the terminal devices 22 for the seats 14 may be connected to the server 24 over a local area network 34, one segment of which may preferably be Ethernet. The IFEC system 20 thus also includes a data communications module 36, and more specifically, an Ethernet data communications module 36*a*, e.g., an Ethernet switch or router.

One or more passengers may utilize a portable electronic device (PED) 38 during flight. For purposes of the present disclosure, PEDs 38 refer to smart phones, tablet computers, laptop computers, and other like devices that include a general purpose data processor that executes pre-programmed instructions to generate various outputs on a display, with inputs controlling the execution of the instructions. Although these devices are most often brought on board the aircraft 10 by the passengers themselves, carriers may also offer them to the passengers for temporary use.

Conventional PEDs 38 are understood to incorporate a WLAN (WiFi) module, so the data communications module 36 of the IFEC system 20 includes a WLAN access point 36*b*. The PED 38, via the onboard WLAN network, may connect to the IFEC system 20 to access various services offered thereon such as content downloading/viewing, shopping, and so forth.

Typically, a single WLAN access point 36*b* is insufficient for providing wireless connectivity throughout the cabin, so additional WLAN access points 36*b*-1, 36*b*-2, and 36*b*-3 may be installed at various locations spaced apart from each other. By way of example, the WLAN access points 36*b* and 32*b*-1 may provide connectivity to the first few rows 16 within the first section 18*a*, while the WLAN access point 36*b*-2 provides connectivity to the last few rows 16 within the first section 18*a* and the first few rows 16 within the second section 18*b*. Furthermore, the WLAN access point 62*b*-3 may provide connectivity to the last few rows 16 within the second section 18*b*. These additional WLAN access points 36*b*-1, 36-*b*2, and 36*b*-3 may be connected to the IFEC system 18 over an Ethernet link that is part of the aforementioned local area network 34. The local area network interface or data communications module 36 is understood to encompass the hardware components such as the WLAN transceiver, antennas, and related circuitry, the Ethernet router/switch, as well as the software drivers that interface the hardware components to the other software modules of the IFEC system 20.

Due to the speed/bandwidth limitations associated with current implementations of WiFi and other wireless data networking modalities, the communications between each of the terminal devices 22 and the server 24 is understood to be over the wired local area network 34. However, it will be appreciated that this is by way of example only and not of limitation. Future wireless networking modalities may bring substantial improvements in transfer speed and available bandwidth such that all of the terminal devices 22 are connected wireless. Indeed, this would be desirable because in the weight-restricted context of aircraft installations, the elimination of cables and associated switch/router interfaces would improve aircraft operational efficiency. In this regard, the alternative WiFi data communications module 36 is being presented to illustrate the possibility of utilizing other data networking modalities beyond the wired local area network 34.

One of the functions of the IFEC system 20 is to deliver multimedia content data requested by the passenger via the terminal device 22. This multimedia content data may include movies, television shows, music, and so forth, and is understood to be stored in a database that is part of the IFEC system 20 and the server 24 thereof. Additional software modules are understood to be incorporated into the IFEC system 20, including a streaming server that retrieves the multimedia content from the database for transmission to the requesting terminal device 22. There may also be a cataloging/menu application with which the user interacts to select the desired multimedia content. Those having ordinary skill in the art will recognize the additional hardware and software features that may be incorporated into the IFEC system 20 to provide passengers greater utility and entertainment.

The foregoing arrangement of the IFEC system 20, along with its constituent components, have been presented by way of example only and not of limitation. Those having ordinary skill in the art will recognize that the IFEC system 20 and its functional subparts can be arranged and organized in any number of different configurations. Furthermore, there may be additional components not mentioned herein, and certain functions may be handled by a different subpart or component than that to which the present disclosure attributes.

Figure 2:
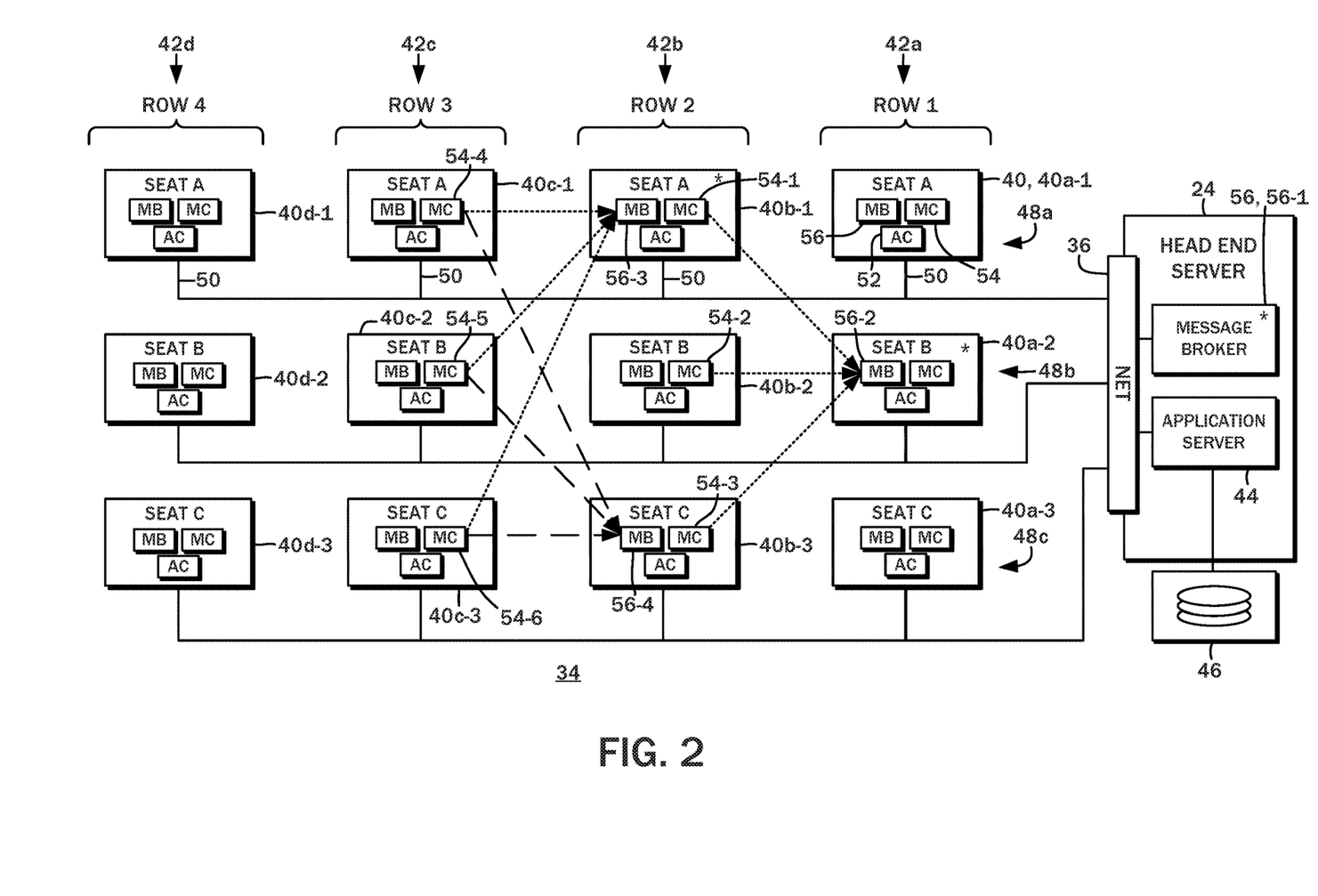
FIG. 2 is a network diagram of an exemplary installation of the IFEC system and showing the interconnection of smart displays to a head-end server.

FIG. 2 illustrates an exemplary network topology that may be utilized in one embodiment of the IFEC system 20. As discussed above in the context of FIG. 1, each seat 14 in the aircraft 10 may have installed thereon a terminal device 22 and a corresponding display 26. FIG. 2 depicts these combined units as a single smart monitor 40, and like the seats 14 in which they are installed, may be logically arranged in multiple rows 42. By way of example, four rows 42 corresponding to rows 16 of the seats 14 are shown, including a first row 42a, a second row 42b, a third row 42c, and a fourth row 42d. Each row 42 may have three seats/monitors: the first row 42a may have a first monitor 40a-1, a second monitor 40a-2, and a third monitor 40a-3. Likewise, the second row 42b may have a first monitor 40b-1, a second monitor 40b-2, and a third monitor 40b-3. The third row 42c may have a first monitor 40c-1, a second monitor 40c-2, and a third monitor 40c-3. Lastly, the fourth row 42d may have a first monitor 40d-1, a second monitor 40d-2, and a third monitor 40d-3.

The IFEC system 20 includes the head-end server 24 that is a computer system including a general-purpose data processor that executes pre-programmed instructions to generate certain outputs in response to certain inputs. When performing the functions of a server, such instructions are understood to be those of an application server 44 that accepts requests from clients, e.g., each of the individual monitors 40, and responds by transmitting data back thereto which correspond to such requests. By way of example, the application server 44 may be a web/HyperText Transfer Protocol (HTTP) server that serves text and other data in response to specific requests therefor originating from one or more of the monitors 40. In further detail, such HTTP server is understood to have connection pooling enabled, which involves the maintenance of a cache of reusable connections thereto. The application server 44 may also be a multimedia streaming server that generates a combined audio/video stream to a requesting streaming client on the monitors 40. The application server 44 may also host other services and application programming interfaces (APIs) utilized by counterpart application clients on the monitors 40. The application server 44, and the head-end server 24 in general, may store the aforementioned text and multimedia data, as well as other types of data in a storage device 46 attached thereto. It will be appreciated that these are examples only, and the application server 44 utilized in the IFEC system 20 may include other types of servers not mentioned herein.

The head-end server 24, as mentioned above, includes the data communications module 36, which may also be referred to herein as a data network interface. Again, in the illustrated embodiment of the IFEC system 20, the data communications module 36 is an Ethernet interface that interconnects each of the monitors 40 to the head-end server 24 over an Ethernet link. Each of the monitors 40 are likewise understood to include an Ethernet interface. According to various implementations, such physical connection may be made over an optical fiber cable, twisted pair cable, or any of the other recognized Ethernet physical link modalities.

In the example shown, the connections between the individual monitors 40 and the data communications module 36 is simplified. Separate outgoing connections or data transfer links 50 from the individual monitors are depicted and are shown joined together as a single bus before connecting to the data communications module 36. Although seating arrangements within the cabin of the aircraft 10 are typically referenced in terms of rows 42, and a specific seat 14 in a given row, the monitors 40 may also be logically arranged in terms of columns 48, of which there is illustrated in FIG. 2 a first column 48a, a second column 48b, and a third column 48c. The monitors 40 in a single column 48 may be interconnected by the single bus that terminates at the data communications module 36.

This physical network topology, however, is presented by way of example only as a media-sharing Ethernet network. There may be separate, direct physical connections between each of the monitors 40 and the data communications module 36, or there may be intermediary switches that connect a set of one or more monitors 40, with a further upstream connection to another network switch, or to the data communications module 36 of the head-end server 24 directly. Those having ordinary skill in the art will readily recognize the various ways in which the physical local area network 34 and the monitors 40 may be configured, particularly in the context of the limited space and limited weight allowance environment of the aircraft 10, as well as different aircraft size and seating class configurations. In general, for purposes of the presently disclosed embodiments, each of the monitors 40 are understood to be connected to the local area network 34, to which the head-end server 24 is also connected.

Regardless of the specific function of, or the type of data served by the application server 44, in addition to the lower layer connections between the monitors 40 and the head-end server 24 (e.g., the physical layer, the data link layer, and the network layer), the monitors 40 are understood to establish a persistent data communications link with the application server 44. More particularly, each of the monitors 40 include an application client 52 that is specifically configured to initiate, maintain, and exchange data over the persistent data communications link with the application server 44. This persistent data communications link is understood to be carried over the data transfer links 50 and the local area network 34. The embodiments of the present disclosure are described in terms of the monitors 40 and the client applications thereon, but it is to be understood that there may be alternatives for other types of clients such as maintenance user interfaces, and other services.

Over different phases of the flight of the aircraft 10, power to the IFEC system 20, including the head-end server 24 and the monitors 40 thereof, are cycled on and off. For example, at the end of a flight after the aircraft 10 is parked, power may be completely disconnected from all onboard electronics. As the aircraft 10 is being prepared for the next flight, power may be connected again, thus turning on the IFEC system 20, among other electronic systems. The services and applications that are needed to respond to requests from the monitors 40 are not immediately available after the head-end server 24 is powered on, and so there is understood to be a startup procedure that loads certain data from permanent storage, e.g., hard drives and loaded into memory, e.g., RAM/Random Access Memory, initiate services that remain active and resident in memory, and so forth. A similar startup procedure is understood to be performed at each of the individual monitors 40.

During the startup procedure, the head-end server 24, and particularly the application server 44 running thereon, may not be able to receive any data from the monitors 40 or respond to any requests from the same. As discussed above, without receiving an acknowledgement from the head-end server 24, the monitors 40 may continue to make requests to the application server 44. Numerous such requests replicated across the entire network of the monitors 40 may lead to substantial delays before the persistent data communications link is established with each, thus delaying the availability of the monitors 40 to accept input and allow interaction by a user/passenger.

Various embodiments of the present disclosure contemplate a reversal with respect to the initiation of the persistent data communications link. That is, the monitors 40 do not initiate the request to establish the persistent data communications link until the application server 44 has published its availability to accept such requests, after its startup procedure has been fully completed. Furthermore, this publication of availability may be limited to certain sets of the monitors 40, so that the application server 44 is not swarmed with requests all at once.

Figure 3:
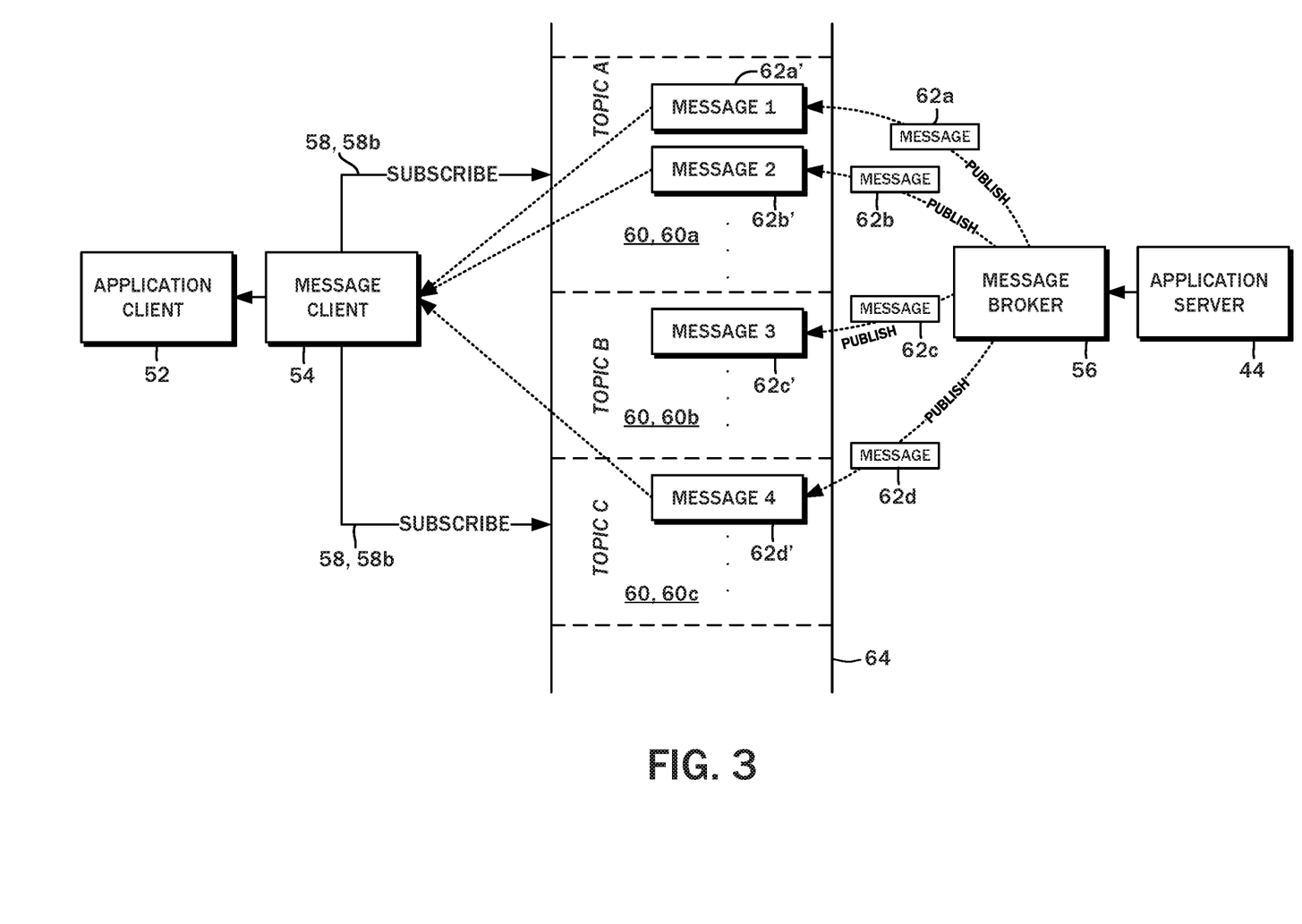
FIG. 3 is a diagram illustrating a publish-subscribe (PUB-SUB) inter-process communications model utilized in the embodiments of the present disclosure.

One embodiment contemplates a publish/subscribe inter-process communications modality as illustrated in the diagram of FIG. 3. Generally, there is a message client 54 and a message broker 56. The message client 54 is understood to subscribe 58 to one or more topics 60. In the illustrated example, a first subscriptions 58a is to a first topic 60a, shown as "TOPIC A," and a second subscription 58b is to a third topic 60c, shown as "TOPIC "C." In addition to the first and third topics 60a, 60c, there is a second topic 60b, to which the message client 54 is not subscribed in the example. The message broker 56 publishes various messages to the topics 60.

The example illustrates a first message 62a being published to the first topic 60a, and once associated with the first topic 60a, it is may be referred to as a first published message 62a'. Similarly, a second message 62b is published to the same first topic 60a, becoming a second published message 62b'. The topics 60 may be implemented as a queue 64, with messages being ordered according to the published sequence. Continuing with the example, the message broker 56 may publish a third message 62c to the second topic 60b, becoming a third published message 62c'. Lastly, the message broker 56 may publish a fourth message 62d to the third topic 60c, and similarly becoming a fourth published message 62d'. The messages 62 may be published at the behest of, for example, the application server 44, though this is by way of example only and not of limitation. Other sources for the directive to publish a message 62 to a topic 60 are also possible.

Because the message client 54 is subscribed to the first topic 60a, the corresponding first and second published messages 62a' and 62b' to the first topic 60a are retrieved by the message client 54. Likewise, with the message client 54 being subscribed to the third topic 60c, the corresponding fourth published message 62d' to the third topic 60c is retrieved by the message client 54. Because the message client 54 is not subscribed to the second topic 60b, it does not see the third published message 62c' published thereto.

Based upon such messages 62 associated with the subscribed-to topics 60 being available for retrieval, and in turn, retrieving and further processing of the same, the message client 54 may take further steps in response. By way of example, the message may be operative to generate instructions to, for example, the application client 52 to take some action. Although the application client 52 was described above as the component that initiates and maintains the persistent data communications with the application server 44, in the context of the pub/sub model described in FIG. 3, these components may be completely independent of each other. That is, the application server 44 may direct the message broker 56 to publish a message 62 that is, in turn, seen by the message client 54, and responsively directs the connected application client 52 to take action that is part of a separate process unrelated to the application server 44.

Along these lines, the message client 54 and the message broker 56 may each be unaware of the specific existence or identity of the other. That is, from the perspective of the message client 54, the identity or identities of the message broker 56 is irrelevant, and similarly, from the perspective of the message broker 56, the identity or identities of the message client(s) 54 is also irrelevant. The message broker 56 continues to publish the messages 62 without receiving any acknowledgement from the message client 54, and the message client 54 as well as the application client 52 to which it is connected may function autonomously whether or not any messages 62 are received from the message broker 56. Thus, the configuration shown in FIG. 3 may be scaled and adapted to, for example, the entire array of monitors 40 that are part of the IFEC system 20. Based upon the improvements contemplated in accordance with the embodiments of the present disclosure, startup times of the IFEC system 20 may be improved by approximately two to three minutes on average, and in more extreme cases, up to six to eight minutes.

The present disclosure refers generally to the topics 60 and the messages 62 published thereto. The illustrated representation of the topics 60 and the message 62 in the queue 64 are presented by way of example only, and those having ordinary skill in the art will recognize that the data structure utilized to represent this arrangement and relationships between the topic and message information may vary. It is to be understood that any suitable implementation may be readily substituted. The queue 64 may reside within the memory space of the message broker 56, though it may also be stored in a separate, network-addressable data store as well. In one exemplary embodiment, the messaging protocol may conform to the MQTT (Message Queuing Telemetry Transport) standard. Alternatively, XMPP (eXtensible Messaging and Presence Protocol), DDS (Data Distribution Service) and others may also be utilized.

The foregoing pub/sub inter-process communications middleware may be utilized to stagger the initiation of the persistent data communications links from different sets of monitors 40 to the application server 44. For example, the message broker 56 may publish a message to a topic 60 that is designated for indicating the availability of the application server 44 to take requests. The topic 60 may be named or identified as descriptively as "SERVER IS UP," though any other suitable name or identification may be set for the topic 60. One or more of the monitors 40, or more specifically, the message clients 54 thereon may subscribe to such topics in accordance with the modalities described above. Thus, such message clients 54 are receptive to those messages 62 published to such topics 60 by the message broker 56. The message client 54 handles the messages on the topics 60 to which it is subscribed, and can act on such messages by, for example, initiating a further process to be handed off to the application client 52. In the example embodiment, with the application client 52 thus knowing that the application server 44 is up and available, transmits a request to initiate the persistent data communications link therewith.

Referring again to the diagram of FIG. 2, by way of example, the message clients 54 on the monitors 40*a*-1 to 40*a*-3 in the first row 42*a* may be subscribed to a first topic that corresponds to the application server 44 being available and ready to accept connection requests from the monitors 40 of the first row 42*a*. When the message clients 54 retrieve this message, all of the first row monitors 40*a*-1 to 40*a*-3 may initiate the persistent data communications link to the application server 44. However, this message may be ignored/disregarded by the other monitors 40 such as those in the second row 42*b* to the extent they are not subscribed to the first topic. These second row monitors 40*b*-1 to 40*b*-3 may instead be subscribed to a second topic that corresponds to the application server 44 being available and ready to accept connection requests from the monitors 40 in the second row 42*b*. Such a message would be ignored or disregarded by the monitors in the first row 42*a*, for example, to the extent they are not subscribed to the second topic.

Thus, in general terms, among the plurality of message clients 54 associated with a respective one of the monitors 40, there may be a first set, e.g., message clients 54 on the monitors 40*a*-1, 40*a*-2, and 40*a*-3 subscribed to a first one of the selected topics, while there may be a second set, e.g., message clients 54 on the monitors 40*b*-1, 40*b*-2, and 40*c*-3 subscribed to a second one of the selected topics. These messages may be published staggered in time, that is, the first message may be published at a first time point, and the second message may be published at a second time point different from the first time point. This is contemplated to stagger the timing of the requests generated by the monitors 40 so that the concurrent number of the same directed to the application server 44 may be remain at levels where desired quality of service is maintained, and a pile-up of requests may be avoided. Because of the greater efficiency, startup times of the monitor 40 as well as of the IFEC system 20 as a whole may be reduced.

In the illustrated example of FIG. 2 where there are only four rows and three seats or monitors 40 in each, the single message broker 56 may be sufficient for achieving desirable performance objectives. Where the system is scaled beyond this, however, additional efficiencies may be gained by instantiating additional message brokers on the monitors 40, with those serving a limited number of message clients 54. In this regard, each of the monitors 40 are likewise understood to incorporate the message broker 56 as generally illustrated in the diagram of FIG. 2.

Figure 4:
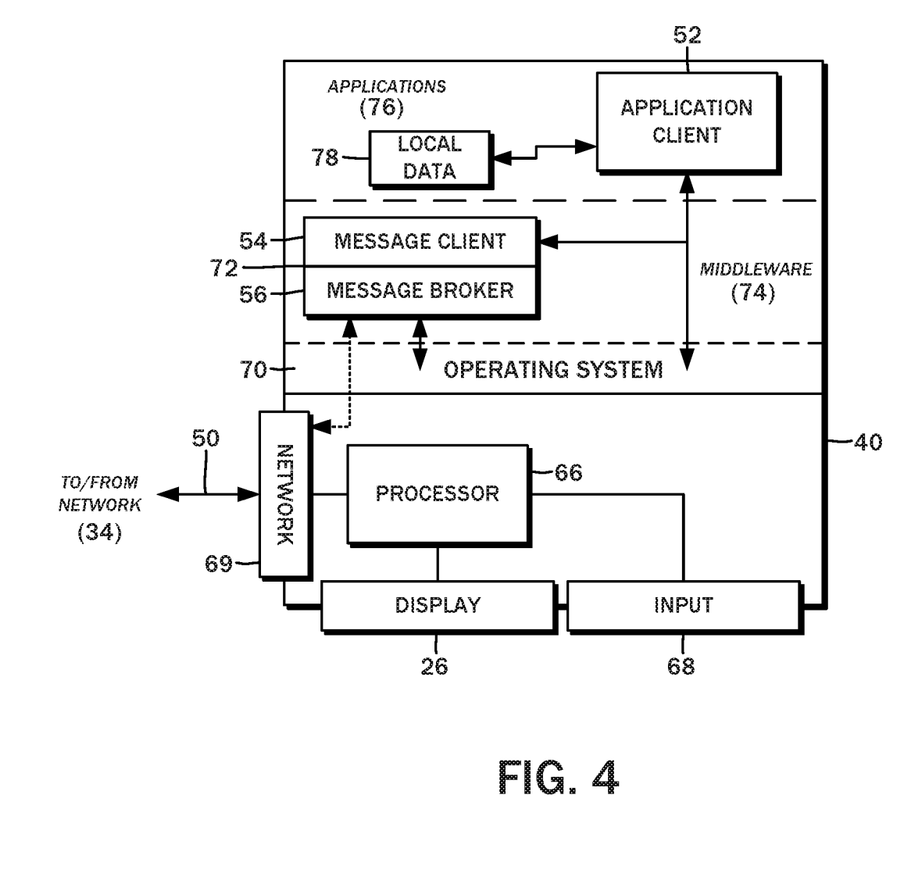
FIG. 4 is a block diagram of the components of an exemplary smart display of the IFEC system.

Additional details of the monitor 40 are shown in the block diagram of FIG. 4, with the various components thereof and the functional inter-relationships. As discussed above, the monitor 40 may be implemented with a general-purpose computer system with a processor 66 that executes various pre-programmed instructions, while accepting inputs from one or more input devices 68 that affect the execution of such instructions and generating outputs to devices such as the display 26 that are the results of executing the instructions.

The monitor 40 includes a data network interface 69 that is the counterpart to the data communications module 36 of the head-end server 24 and is thus understood to be an Ethernet interface to which a corresponding cable of the chosen physical layer standard is connected. Via the single data transfer link 50, it is also possible to establish direct communication links with the other monitors 40 connected to the local area network 34.

The aforementioned instructions executed by the processor 66 is understood to be that of an operating system 70 which manages the hardware and software resources of the monitor 40. Additionally, a pub/sub inter-process communications service 72 may be on a middleware layer 74 that is separate from the operating system 70. The pub/sub inter-process communications service 72, which may be more referred to more simply as the pub/sub service 72, includes at least the above-described message client 54 and the message broker 56. In the context of the monitor 40, this message broker 56 may be identified as a local message broker, while the message broker running on the head-end server 24 or on a different monitor 40 may be referred to as a remote message broker. The components implemented in software, e.g., the operating system 70, the pub/sub service 72, the application client 52, and so on, are understood be instructions that are executed by the processor 66 of the monitor 40.

The middleware layer 74 is understood to be separate from an application layer 76 where the application client 52 resides. As shown, the application client 52 sends and receives data between the pub/sub service 72, which connects to the remote message brokers 56 over the data transfer links 50 established by the data network interface 69. Certain aspects of the operation of the local message broker 56 may involve the operating system 70, and so a direct interface may exist, as shown. There are also aspects involving the application client 52, such as the initiation of the persistent data communications link to the application server 44, so there is also direct interface between the pub/sub service 72 and the application client 52. The application client 52 may also perform functions that directly invoke the services or otherwise utilize a feature that is implemented within the operating system 70.

Referring again to the diagram of FIG. 2, any one of the message brokers 56 on the monitors 40 may be activated as needed to provide the same pub/sub services that are performed by the remote message broker 56 on the head-end server 24. For example, the second monitor 40*a*-2 in the first row 42*a* may be activated as a broker, that is, the message broker 56-2 thereof is instantiated and begins performing the functions described above. In this context, the message broker 56 of the head-end server 24 may also be identified with reference number 56-1 The monitors 40*b* in the second row 42*b* may be subscribed to various topics 60, but otherwise directed to communicate directly (and/or only) with the message broker 56-2 to check for published messages for those topics 60 to which the message clients 54-1, 54-2 and 54-3 are subscribed.

It is expressly contemplated that multiple message brokers 56 may be activated, with each such message broker being specifically designated for a selected set of message clients 54. For instance, if the message broker 56-2 of the monitor 40*b*-1 in the second row is, in turn, activated, the monitors 40*c* in the third row 42*c*, and in particular the message clients 54-4, 54-5, and 54-6 thereon may communicate exclusively with the message broker 56-3. In this manner, a network or a cluster of message brokers 56 may be established to offload the computing load from the head-end server 24, and provide some redundancy in the event any of the message brokers 56 fail.

Figure 5A:
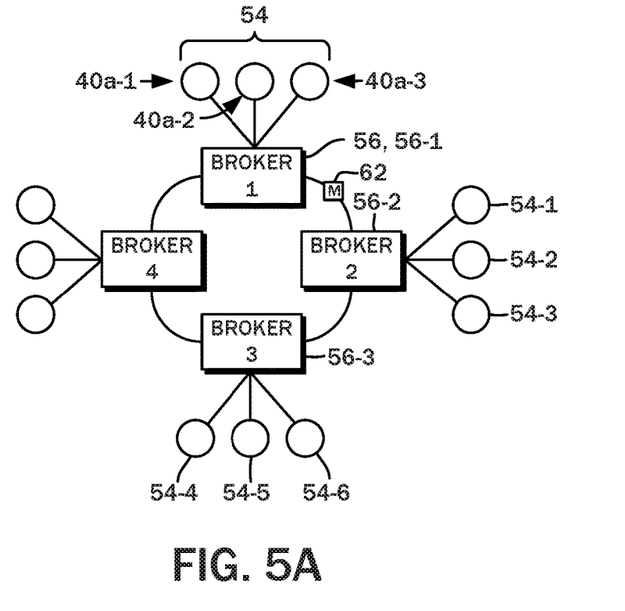
FIGS. 5A and 5B depict exemplary network topologies that may be utilized to implement the IFEC system of the present disclosure.

Independent of the data transfer links 50 and the topology of the local area network 34 discussed above, the network of message brokers 56 may be arranged in various ways. Referring to FIG. 5A, one such network arrangement is a ring-type network in which the messages 62 are multicast. Specifically, there is the first message broker 56-1, which is understood to be the one running on the head-end server 24. As described above in the context of FIG. 2, this message broker 56-1 may be in communication with the message clients 54 of the monitors 40*a*-1, 40*a*-2, and 40*a*-3 of the first row 42*a*. Moreover, once the message broker 56-2 on the monitor 40*a*-2 is activated, the message clients 54-1, 54-2, and 54-3 running on the monitors 40*b*-1, 40*b*-2, and 40*b*-3, respectively, of the second row 42*b* begin communicating therewith. The previously mentioned message broker 56-3 of the monitor 40*b*-1, in turn publishes messages for the message clients 54-4, 54-5, and 54-6 running on the monitors 40*c*-1, 40*c*-2, and 40*c*-3, respectively, of the third row 42*c*. The network of message brokers 56 may be expanded in accordance with the foregoing, though the details thereof will be omitted for the sake of avoiding redundancy.

Once the message broker 56 on the head-end server 24 publishes the message 62 to a given topic 60, such publication is understood to propagate to each of the message brokers 56-2, 56-3, and so forth. In the multicast configuration shown in FIG. 5A, the message 62 is sequentially passed from one message broker to another, and upon receipt thereby, published according to the modalities discussed above. The aforementioned queue 64 is understood to be replicated across the entire network of the active message brokers 56.

Figure 5B:
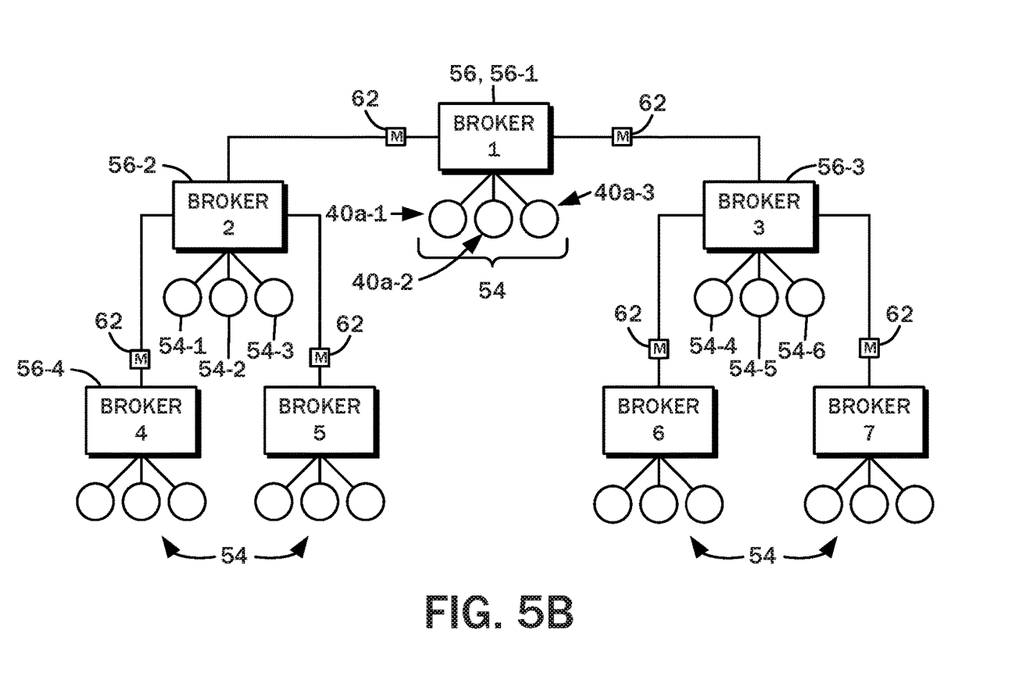

FIG. 5B illustrates another networking arrangement of the message brokers 56 that has a tiered configuration. Again, there is the first message broker 56-1 which is running on the head-end server 24. The reach of the messages 62 published by the message broker 56-1, regardless of the topic, are limited to the message clients 54 of the monitors 40*a*-1, 40*a*-2, and 40*a*-3. In this configuration, however, the published message 62 is passed to the second message broker 56-2 and the third message broker 56-3, both of which independently publish the message to its own audience of message clients 54-1, 54-2, and 54-3, and 54-4, 54-5, and 54-6, respectively. There may be additional tiers of message brokers 56-4 and 56-5 that are in direct communication with the second message broker 56-2, as well as message brokers 56-7 and 56-7 that are in direct communication with the third message broker 56-3, each with its own audience of message clients 54. Messages 62 are propagated from one broker to another as is the case with the multicast configuration shown win FIG. 5A, though the specific propagation through the tiers of message brokers 56 is different.

Although two types of networking arrangements have been described above with reference to FIGS. 5A and 5B, these are presented by way of example only and not of limitation. Furthermore, regardless of the networking arrangement of the message brokers 56, it is contemplated that on an individual basis, the message brokers 56 may contract or expand the cluster in response to changes in certain conditions. For example, if one of the message brokers 56 becomes deactivated or disconnected, another one may be brought online to receive the propagated messages 62 and publish the same to its audience of monitors 40. A heartbeat modality may be utilized to confirm that all of the message brokers 56 within the network are responsive, and if the heartbeat message is not received by any one, corrective measures may be taken on the monitor 40 detecting the anomaly. Such corrective measures may include, for example, instantiating another active message broker 56. The instantiated message broker may be on the same monitor 40, or another one that is in communication therewith.

With reference again to FIG. 2, if, for example, the third message broker 56-3 is deactivated or otherwise becomes unresponsive, and is detected as such by one or more of the message clients 54-4, 54-5, or 54-6 connected thereto, such message clients 54 may command another one of the upstream message brokers to activate. For purposes of this example, this message broker 56 may be the one on the monitor 40*b*-3 in the second row 42*b*, that is, the fourth message broker 56-4 identified thus in the figure. This transition may be predefined in the message clients 54-4, 54-5, and 54-6, or may commanded to do so by the message broker 56 local thereto, or any other command source. These message clients then communicate directly with the fourth message broker 56-4 to capture the published messages to the various topics 60.

Those having ordinary skill in the art will recognize that there are many other self-healing techniques known in the art, and those may be applied to the presently disclosed IFEC system 20. Further, the selection of the particular monitors 40 on which the message brokers 56 are to be instantiated may be based upon the optimized distribution of the data traffic load across the entirety of the local area network 34.

Using the network of message brokers 56 and the message clients 54 connected thereto, various data utilized in offering the entertainment and communications services on the monitor 40 may also be propagated thereto, in addition to publishing information to application clients 52 that results in some action being taken such as the aforementioned message indicating that the head-end server 24 is online and accepting connection requests, expanding or contracting the network of message brokers 56, and so forth. The propagated data may be common across a flight of the aircraft such as the destination and origin airport names, flight identifier, estimated departure and/or arrival times, expected duration of the flight, the expected duration of connectivity to satellite Internet links, and the like. This dynamic information may be refreshed after each flight, and it is envisioned to be convenient to be loaded at a single location, e.g., the head-end server 24, and automatically propagated to each of the monitors 40.

There may also be data utilized by the application client 52 that is stored locally on the monitor 40 and is relatively static. This includes data such ratings for multimedia content available on the IFEC system, content recommendation data, past viewing history, and other content catalog related information. Referring again to the block diagram of FIG. 4, this data may be retrieved from a local data store 78. In order to minimize the traffic on the local area network 34, storing as much data as possible on to the local data store 78 is understood to be desirable. The application client 52 may connect to the local data store 78 and retrieve the data for use in presenting the IFEC services to the passenger.

Figure 6:
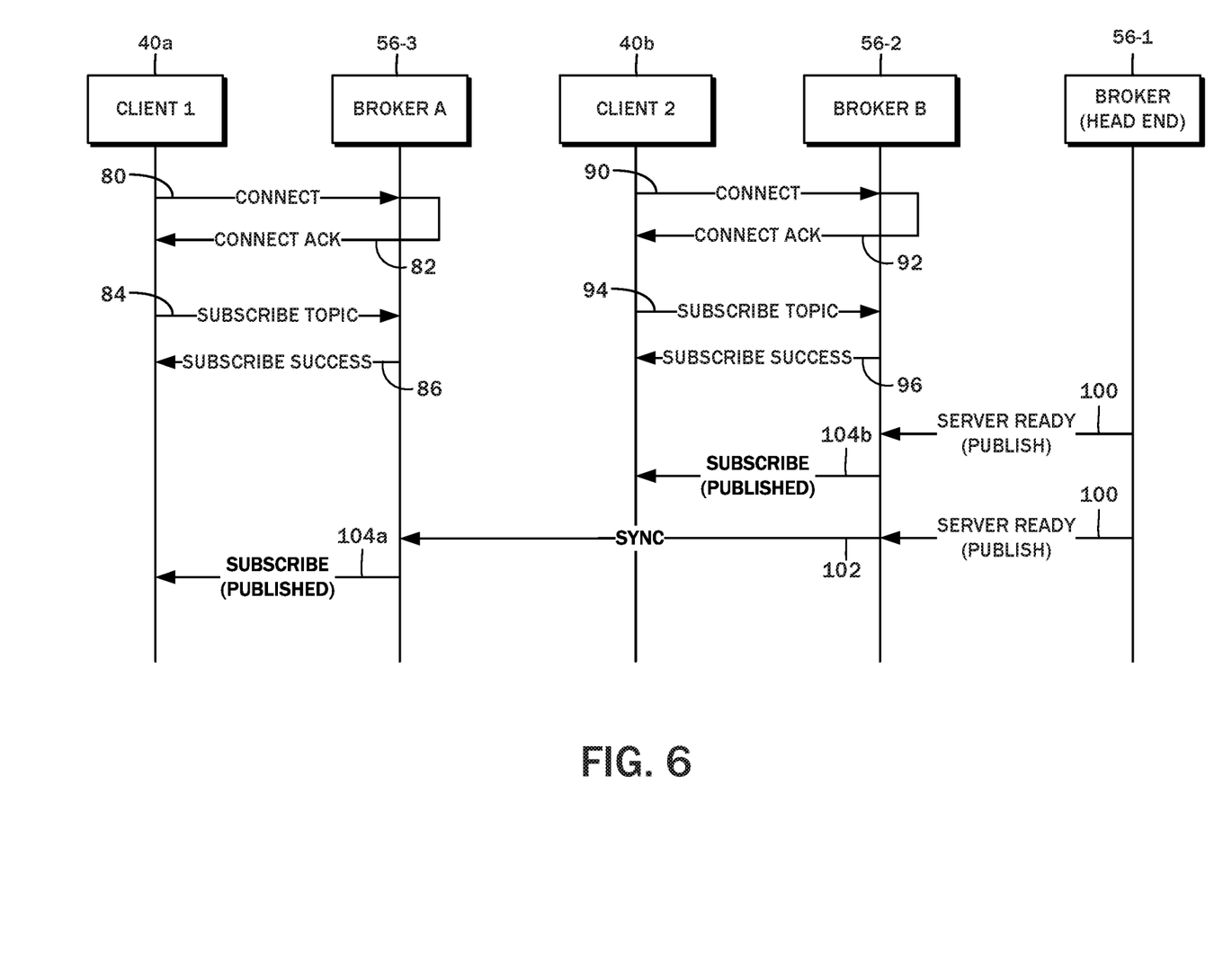
FIG. 6 is a data communications sequence diagram showing the pertinent components of the IFEC system, in particular, one or more smart displays and the head-end server, along with typical data transmission interactions between such components.

Having considered the individual components of the IFEC system 20 and the way in which the pub/sub service 72 can be used in connection therewith, one aspect of the process for initiating connectivity services between a plurality of monitors 40 and the head-end server 24 will now be described. The data communications sequence diagram of FIG. 6 illustrates this process in the context of a first client or monitor 40*a* and the message client 54 thereof, the message broker 56-3, a second client or monitor 40*b* and the message client 54 thereof, the message broker 56-2, and the head-end message broker 56-1.

The first monitor 40a, and specifically the message client 54 thereof, initiates a connection request 80 to the message broker 56-3. If the connection request 80 is successfully received, the message broker 56-3 generates a connection acknowledgement 82. After receiving the connection acknowledgement 82, the first monitor 40a subscribes to one or more topics in a subscription request 84 that is generated to the message broker 56-3. Unlike conventional pub/sub implementations, the message clients 54 of the presently contemplated embodiments may be able to subscribe to a topic before the head-end server 24 is started. One exemplary embodiment of the subscription procedure has been described above, and is understood to be applicable in this context as well. The message broker 56-3 may respond with a subscription success 86.

There is also the second monitor 40b, and in particular the message client 54 thereof, that similarly initiates a connection request 90 to a different message broker 56-2. If the connection request 90 is successfully received, the message broker 56-4 generates a connection acknowledgement 92. The second monitor 40b in response subscribes to one or more topics in a subscription request 94 generated to the message broker 56-4. In the example illustrated, the first monitor 40a and the second monitor 40b is subscribed to at least one common topic, which may be for the availability of the application server 44 to accept requests to initiate persistent data communication links.

Once the head-end server 24 has completed its startup procedure, its message broker 56-1 is commanded to publish to the topic of the availability of the application server 44 to accept requests to initiate persistent data communication links therewith. This message 62 is published to the topic 60 in a publish step 100, and propagated to the message broker 56-2. Additionally, as between the message broker 56-2 and the message broker 56-3 the message 62/topic 60 queue is synchronized in accordance with a sync step 102. The message 62 is thus made available to both the monitor 40a from the message broker 56-3, and the monitor 40b from the message broker 56-2. The message 62 from the message broker may be obtained via a retrieval steps 104a, 104b that is performed by the monitor 40a, 40b, respectively.

More generally, the present disclosure contemplates a method for initiating connectivity services between a plurality of monitors 40 and the head-end server 24 of the IFEC system 20. As described above, the monitors 40 each include the message client 54, the message broker 56, as well as the application client 52 that utilizes the connectivity services with the application server 44 running on the head-end server 24. The message broker 56 is also running on the head-end server 24. Referring now to the flowchart of FIG. 7, this method begins with a step 200 of initiating a startup procedure on each of the plurality of monitors 40 as described earlier. These procedures may include, for example, loading services into memory/execution, loading data, establishing data communications links, and so on.

Figure 7:
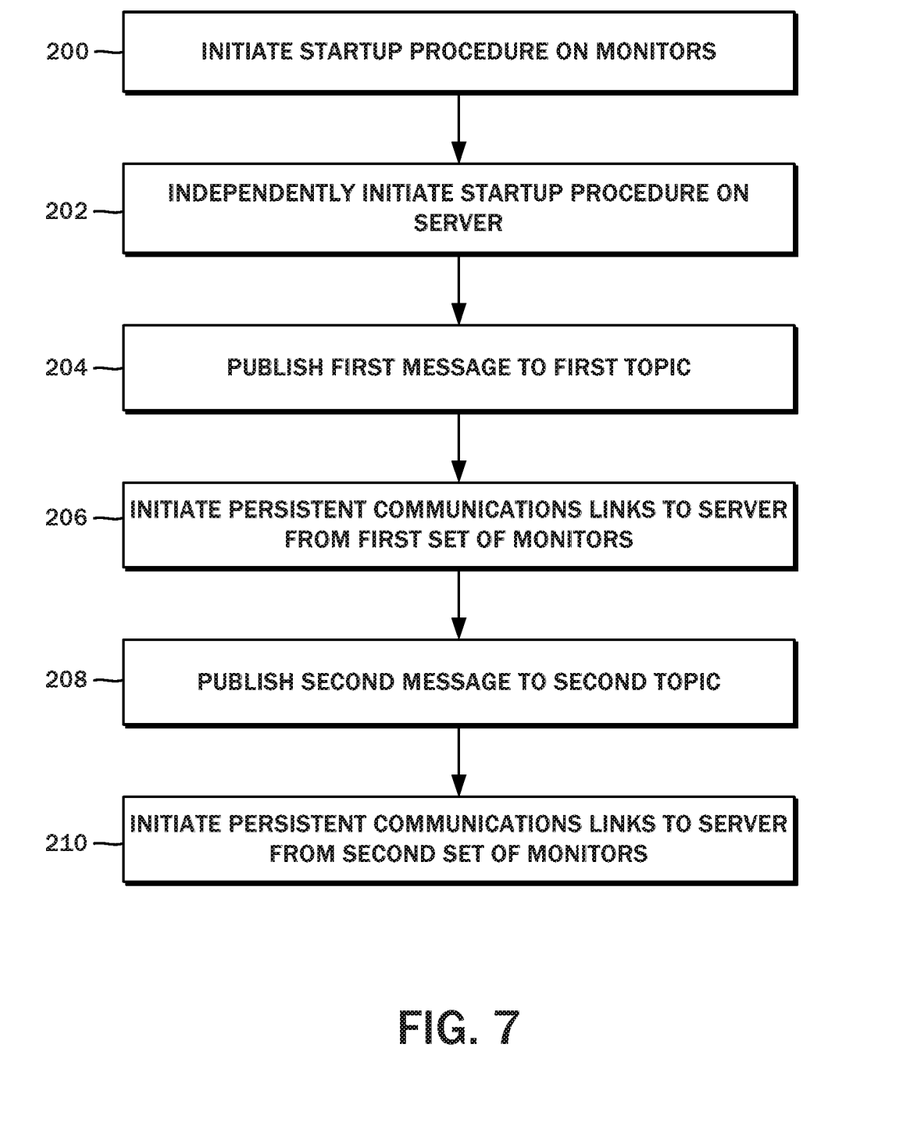
FIG. 7 is a flowchart of a method for initiating connectivity services between a plurality of smart displays and the head-end server.

Each of the message clients 54 may be subscribed to one or more topics. In particular, a first set thereof may be subscribed to a first topic, while a second set may be subscribed to a second topic. Both the first topic and the second topic may indicate that the application server 44 is online and available, but the first topic may be specific to accepting connection requests only from the first set of message clients 54, while the second topic may be specific to accepting connection requests only from the second set of message clients 54.

The method may also have a step 202 of independently initiating a server-side startup procedure on the head-end server 24. As described above, the head-end server 24 includes its own message broker 56, as well as the application server 44.

Thereafter, in a step 204, the message broker 56 of the head-end server 24 publishes a first message to the first topic. This message may be published in response to a completion of the server-side startup procedure. Following the retrieval of the first message by the first set of message clients 54, the corresponding application clients 52 on the same monitor 40 may initiate persistent communications links to the application server 44 in a step 206.

The sequence of steps 204 and 206 may be repeated for a second message that initiates the connection of the second set of message clients 54 with the application server 44. In particular, there is a step 208 in which the message broker 56 of the head-end server 24 publishes a second message to the second topic. The second message may be published at some time after the completion of the server-side startup procedure, and is contemplated to be separate and independent of the publishing of the first message. However, for a defined staggering of the publishing of the first message and the second message, the second message may be published in response to one or more evaluated conditions. These conditions may be indicators generated by the application server 44 that it has connected to all of the first set of application clients 52 and is thus available to proceed to the next step of connecting to the second set of application clients 52. Following the publication of the second message to the second topic, and retrieval of the second message by the second set of message clients 54, there may be a follow-on step 210 of initiating persistent communications links from the second set of application clients 52.

The embodiments of the present disclosure may be extended to communications that are initiated from the monitor 40 to the head-end server 24, as well as monitor-to-monitor communications to the extent any server is awaiting an underlying component to serve a request. The request is responded to synchronously, with a message being published to a topic when the response is available for a given request or originating monitor 40.

The particulars shown herein are by way of example only for purposes of illustrative discussion, and are presented in the cause of providing what is believed to be the most useful and readily understood description of the principles and conceptual aspects of the various embodiments of the in-flight entertainment and communications systems with improved efficiency in the startup of connectivity services utilized by passenger display terminals and head-end servers set forth in the present disclosure. In this regard, no attempt is made to show any more detail than is necessary for a fundamental understanding of the different features of the various embodiments, the description taken with the drawings making apparent to those skilled in the art how these may be implemented in practice.

What is claimed is:

1. A system for establishing persistent communications links between a plurality of terminals and a primary server, the system comprising:
one or more message brokers each publishing messages to one or more topics, a first one of the one or more message brokers being executed on the primary server, and a second one of the one or more message brokers being executed on one of the plurality of terminals;
a plurality of message clients each on a corresponding one of the plurality of terminals, each of the terminals being connected to the primary server over a data transfer link and each of the message clients subscribing to selected topics, the message clients being receptive to those messages published by the one or more message brokers to the topics to which the respective one of the message clients is subscribed; and a plurality of application clients each on a corresponding one of the plurality of terminals and linked with the respective one of the message clients thereon, at least one of the plurality of application clients initiating a request to the primary server in response to a published message to at least one of the topics to which the linked message client is subscribed, wherein a deactivation of one of the one or more message brokers is detectable by at least one of an active one of the one or more message brokers, with another one of the one or more message brokers being activated by the active one of the message brokers in response.

2. The system of claim 1, wherein the messages published by the first one of the message brokers are propagated to the second one of the message brokers.

3. The system of claim 2, wherein the second one of the message brokers responsively publishes messages to the one or more topics upon receipt of the propagated messages from the first one of the message brokers.

4. The system of claim 2, wherein a first selected subset of the plurality of message clients are exclusively linked to the first one of the message brokers for reception of the published messages, and a second selected subset of the plurality of message clients are exclusively linked to the second one of the message brokers for reception of the published messages.

5. The system of claim 1, wherein the plurality of message clients includes a first set of message clients subscribed to a first one of the selected topics, and a second set of message clients subscribed to a second one of the selected topics.

6. The system of claim 5, wherein the one or more message brokers publishes a message to the first one of the selected topics at a first time point and a message to the second one of the selected topics at a second time point different from the first time point.

7. The system of claim 1, wherein the published message is an indication of availability of the primary server to accept requests from the plurality of application clients on the terminals to establish the persistent communications links therewith.

8. The system of claim 1, wherein the published message is dynamic data transferred to each of plurality of terminals prior to the establishment of the persistent communications link to the primary server.

9. An in-flight entertainment and communication head-end server connectible to a plurality of passenger display terminals, the server comprising:

a data network interface connecting to each of the plurality of passenger display terminals over data transfer links;

an application server with which each of the plurality of passenger display terminals selectively establishes a persistent communications link over the respective data transfer links; and a message broker publishing messages to one or more selected topics, a first selected subset of the passenger display terminals being directed to initiate the respective one of the persistent communications links to the application server based upon a message published to a first topic to which message clients being executed on corresponding ones of the first selected subset of the passenger display terminals is subscribed, wherein the message broker activates a message broker service on a first one of the passenger display terminals, the message broker service publishing the messages to the one or more selected topics for a second selected subset of the passenger display terminals executing message client services in communication with the message broker service and subscribed to the selected topics.

10. The head-end server of claim 9, wherein a second selected subset of the passenger display terminals are directed to initiate the respective one of the persistent communications links to the application server based upon another message published to a second topic to which the message clients being executed on the corresponding ones of the second selected subset of the passenger display terminals is subscribed.

11. The head-end server of claim 10, wherein the message to the first topic is published at a different time than when the message to the second topic is published.

12. The head-end server of claim 9, wherein the application server is a hypertext transfer protocol web server.

13. An in-flight entertainment and communications passenger display terminal comprising:

a processor;

a data network interface connectible to a head-end server computer system and other passenger display terminals over one or more data transfer links;

a message client executed by the processor, the message client being subscribed to one or more topics to which a remote message broker service publishes messages;

an application client executed by the processor, the application client initiating a persistent communications link to an application service being executed on the head-end server computer system in response to a first message published by the remote message broker service to a first one of the one or more topics to which the message client is subscribed; and a local message broker service with a deactivated state and an activated state, the local message broker service being in communication with the other passenger display terminals and in the activated state, publishing messages to the one or more topics to which message clients being executed on the other passenger display terminals are subscribed, wherein the local message broker service being in a deactivated state is detected by at least one of one or more active message brokers, with another message broker being activated by the active message brokers in response.

14. The terminal of claim 13, further comprising an application data storage connected to the application client.

15. The terminal of claim 14, wherein one of the messages published by the remote message broker service includes dynamic flight-specific data transferred from the head-end server computer system.

16. The terminal of claim 14, further comprising a local data storage, persistent data stored on the local data storage being retrieved and loaded to the application data storage.

17. The terminal of claim 13, wherein the local message broker service is synchronized with the remote message broker service.

* * * * *